US00RE35758E

United States Patent [19]

Winter et al.

[11] E Patent Number: Re. 35,758

[45] Reissued Date of Patent: Mar. 31, 1998

[54] VOICE/DATA-FORMATTED TELEPHONE INFORMATION STORAGE AND RETRIEVAL SYSTEM

[75] Inventors: Walter W. Winter, Indian Harbour Beach; Jo Morris, Merritt Island; Dale E. Cannon, Palm Bay, all of Fla.

[73] Assignee: Golden Enterprises, Inc., Melbourne, Fla.

[21] Appl. No.: 653,916

[22] Filed: May 28, 1996

Related U.S. Patent Documents

Reissue of:

[64] Patent No.: 4,918,322
Issued: Apr. 17, 1990
Appl. No.: 254,305
Filed: Oct. 6, 1988

U.S. Applications:

[63] Continuation of Ser. No. 870,580, Apr. 17, 1992, abandoned.

[51] Int. Cl.[6] ..... H04M 3/50; H04M 11/08

[52] U.S. Cl. ..... 379/88; 379/96; 379/214; 379/396

[58] Field of Search ..... 379/67, 88, 89, 379/84, 94, 96, 211, 214, 218, 396; 370/110.1

[56] References Cited

U.S. PATENT DOCUMENTS

| | | | |
|---|---|---|---|
| 3,111,561 | 11/1963 | Dunning | 379/82 |
| 3,728,486 | 4/1973 | Kraus | 379/69 |
| 3,784,721 | 1/1974 | Kilby | 379/74 |
| 3,920,908 | 11/1975 | Kraus | 379/91 |
| 3,943,290 | 3/1976 | Golden | 379/84 |

(List continued on next page.)

FOREIGN PATENT DOCUMENTS

| | | | |
|---|---|---|---|
| 3221683 | 12/1983 | Germany | 379/89 |
| 55-158766 | 12/1980 | Japan . | |
| 56-090664 | 7/1981 | Japan . | |
| 56-84063 | 7/1981 | Japan . | |
| 57-186867 | 11/1982 | Japan . | |
| 0119164 | 6/1985 | Japan | 379/94 |
| 2098428 | 11/1982 | United Kingdom | 379/88 |

OTHER PUBLICATIONS

"DAS/V Functional Specification" [publisher unknown], DR-025-01, Aug. 1983.

"Speech Processing in Public Telephone Exchanges", R. Christensen et al., *Electrical Communication*, vol. 59, No. 3, May 1985, pp. 266–272.

"Conversant-1 Voice System: Architecture and Applications", R.J. Perdue, et al., *A.T.&T. Tech. Jour.*, Sep./Oct. 1986, vol. 65, No. 5, pp. 34–47.

"Automating operator services", Albert J. Angel, *Payphone Mag.*, vol. 4, No. 4, Apr. 1988, pp. 68–70.

(List continued on next page.)

*Primary Examiner*—Thomas W. Brown
*Attorney, Agent, or Firm*—Charles E. Wands

[57] ABSTRACT

A synthesized message storage and retrieval *system* generates response messages by concatentating a sequence of words that have been recorded in digital memory in the voice of the operator in accordance with prescribed inflection characteristics. By linking together phrases or words having selectively chosen inflections in the voice of the operator, the resulting vocalized message will more naturally simulate the manner of speech of the operator and thereby provide a more realistic verbalization of the message to the customer. In accordance with the communications functionality of the operator's voice message mechanism, the system performs a plurality of tasks for the operator, including automatically answering all incoming calls with a prerecorded phrase dependent on the type of call being serviced and, by means of an auxiliary audio interface with the call director, the output message can be delivered to the customer whether or not the operator is connected to the call. In addition, rather than audibly vocalizing the message out to the calling subscriber, when retrieved from memory the contents of the message are transmitted in digital format, so that they may be captured and visually indicated to the customer via a digital display provided in the calling subscriber's telephone equipment.

41 Claims, 3 Drawing Sheets

U.S. PATENT DOCUMENTS

| | | | |
|---|---|---|---|
| 4,012,599 | 3/1977 | Meyer | 379/96 |
| 4,015,090 | 3/1977 | Kitada | 379/79 |
| 4,032,712 | 6/1977 | Catto et al. | 379/76 |
| 4,071,698 | 1/1978 | Barger, Jr. et al. | 379/84 |
| 4,079,200 | 3/1978 | Meri | 379/80 |
| 4,152,547 | 5/1979 | Theis | 379/70 |
| 4,255,618 | 3/1981 | Danner et al. | 379/88 |
| 4,277,649 | 7/1981 | Sheinbein | 379/201 |
| 4,313,035 | 1/1982 | Jordan et al. | 379/207 |
| 4,328,396 | 5/1982 | Theis | 379/71 |
| 4,355,207 | 10/1982 | Curtin | 379/67 |
| 4,420,656 | 12/1983 | Freeman | 379/73 |
| 4,549,047 | 10/1985 | Brian et al. | 379/88 |
| 4,593,157 | 6/1986 | Usdan | 379/89 |
| 4,600,809 | 7/1986 | Tatsumi et al. | 379/88 |
| 4,623,761 | 11/1986 | Winter et al. | 379/84 |
| 4,633,041 | 12/1986 | Boivie et al. | 379/354 |
| 4,645,873 | 2/1987 | Chomet | 379/93 |
| 4,697,282 | 9/1987 | Winter et al. | 379/67 |
| 4,734,930 | 3/1988 | Quiros et al. | 379/88 |
| 4,788,715 | 11/1988 | Lee | 379/84 |
| 4,797,911 | 1/1989 | Szlam et al. | 379/67 |
| 4,922,519 | 5/1990 | Daudelin | 379/67 |
| 4,959,855 | 9/1990 | Daudelin | 379/213 |

OTHER PUBLICATIONS

"Operator Services Systems Generic Requirements", vol. 1, Common Capabilities, Sections 1–13, Tech. Ref. TR-T54-000271, Issue II, Dec. 1985; Rev. 3, Mar. 1988, Bell Communications Research.

Byrne, C.J. et al., "Automatic Intercept System", *the Bell System Technical Journal*, Jan. 1974, 53(1), 1–176.

Eigen, D.J. and Youngs, "Stored Program Controlled Network", *The Bell System Technical Journal*, Sep. 1982, 61(7), 1715–1735.

Nussbaum, E. et al., "Voice Storage System", *The Bell System Technical Journal*, May–Jun. 1982, 61(5), 811–921.

Rowley, J.E. and Bernardini, "Using Magnetic Bubble Memories to Provide Recorded Announcements", *The Bell System Technical Journal*, Oct. 1982, 61(8), 1841–1861.

Van Den Bossche, M. et al., "Modern Manual Assistance Positions", *Electrical Communication* 1977, 52(2), 107–114.

VOICE/DATA-FORMATTED TELEPHONE INFORMATION STORAGE AND RETRIEVAL SYSTEM

Matter enclosed in heavy brackets [ ] appears in the original patent but forms no part of this reissue specification; matter printed in italics indicates the additions made by reissue.

*This is a continuation of Reissue application Ser. No. 07/870,580, filed Apr. 17, 1992, now abandoned, which application is a Reissue of U.S. Pat. No. 4,918,322, granted on Apr. 17, 1990, of Walter W. Winter et al for a VOICE/DATA-FORMATTED TELEPHONE INFORMATION STORAGE AND RETRIEVAL SYSTEM.*

FIELD OF THE INVENTION:

The present invention relates, in general, to telephone systems, and is particularly directed to a call answering system through which information requested by a calling subscriber, such as directory assistance information, may be selectively returned to the calling party as an audio message in the operator's voice or in digital format to be captured and displayed at the calling party's equipment.

BACKGROUND OF THE INVENTION:

Operator-assisted telephone service facilities, such as directory assistance, toll service and private branch exchanges, require that the servicing operator handle a large number of similar, (effectively monotonous routine) calls during the operator's work period. In a directory assistance position, where the monotony problem is particularly acute, it has been common practice to provide the operator with a mechanized voice storage and retrieval unit (commonly referred to as an automatic response unit, or ARU) which, when accessed from the operator's terminal position (simultaneously releasing the operator to handle another call), assembles a verbalized response message by stringing together a series of prerecorded or synthesized words, typically comprised of an introductory phrase (such as "The number is") followed by a sequence of numerical digits, and couples this 'android-sounding'audio message to an automated call director (switch) for application over the telephone line to the calling party.

Now, although the use of an automatic response unit provides some assistance to the operator, from the customer's standpoint its mechanical sounding voice is not only unattractive (and a confusing change from the voice of the operator), but often, to the customer's ear, is of such inferior quality that the customer stays on the line to hear a repeat of the message or until the operator picks up the call and handles the inquiry directly. In either of these events, there is a delay in providing the intended service, which incurs the penalty of user dissatisfaction and lost revenue. Of course, there are many occasions in which the ARU cannot be used to meet the customer's needs, as in the case of a multiple directory number request and for information other than that which has been previously recorded and stored. Under such circumstances it is necessary for direct operator participation; still, the basic information supply exercise conducted by the operator, e.g. that of retrieving a number or address from a database and delivering (speaking) that information to the customer, is the same as when using the ARU.

Advantageously, a considerable aspect of the problem, particularly the quality of the synthesized message vocalized to the customer, is addressed by the telephone operator voice storage and retrieval system described in U.S. Pat. Nos. 4,623,761, issued Nov. 18, 1986 and 4,697,282, issued Sept. 29, 1987, and assigned to the assignee of the present application. Pursuant to the patented scheme, messages to be played back to the customer are prerecorded (digitized and stored in computer-addressable memory) in the voice of the operator who is on-line during the servicing of the call, so that, when retrieved and synthesized out to the calling party, the played-back messages are effectively indistinguishable from the live voice of the operator, thus presenting a realistic audio message to the subscriber, which not only avoids customer confusion, but reduces revenue-impacting delay time.

SUMMARY OF THE INVENTION:

Pursuant to a first aspect of the present invention, the ['personalized'voice] *'personalized voice'* characteristics of the above-identified patented system are extended to a synthesized message storage and retrieval system in which customer response messages (such as a directory assistance-requested number) are generated by concatenating a sequence of words that have been recorded in digital memory in the voice of the operator and selectively accessed from memory in accordance with prescribed inflection (rising, falling, neutral) characteristics. By linking together phrases or words having selectively chosen inflections in the voice of the operator, particularly sequences of numbers (in reply to a directory assistance request), the resulting vocalized message will more naturally simulate the manner of speech of the operator and thereby provide a more realistic verbalization of the message to the customer. In accordance with the communications functionality of the operator's voice message assembly mechanism, the system performs a plurality of tasks for the operator, including automatically answering all incoming calls with a prerecorded phrase dependent on the type of call being serviced and, by means of an auxiliary audio interface with the call director, the output message can be delivered to the customer whether or not the operator is connected to the call.

Pursuant to a second feature of the invention, rather than audibly vocalizing the message out to the calling subscriber, when retrieved from memory the contents of the message are transmitted in digital format, so that they may be captured and visually indicated to the customer via a digital display provided in the calling subscriber's telephone equipment. In the course of use of the digital communication mechanism, in response to an incoming call, an inquiry is sent to the calling subscriber's equipment to determine whether it has the capability of receiving digital data communications. If it does, then the operator may choose to forward the answer to the caller's inquiry as a data communications message, which can be transmitted in a shorter time than required to vocalize out the requested information and, because it is captured and stored by the calling party's equipment, is continuously available to be read by the calling party, until cleared.

Figure 1:
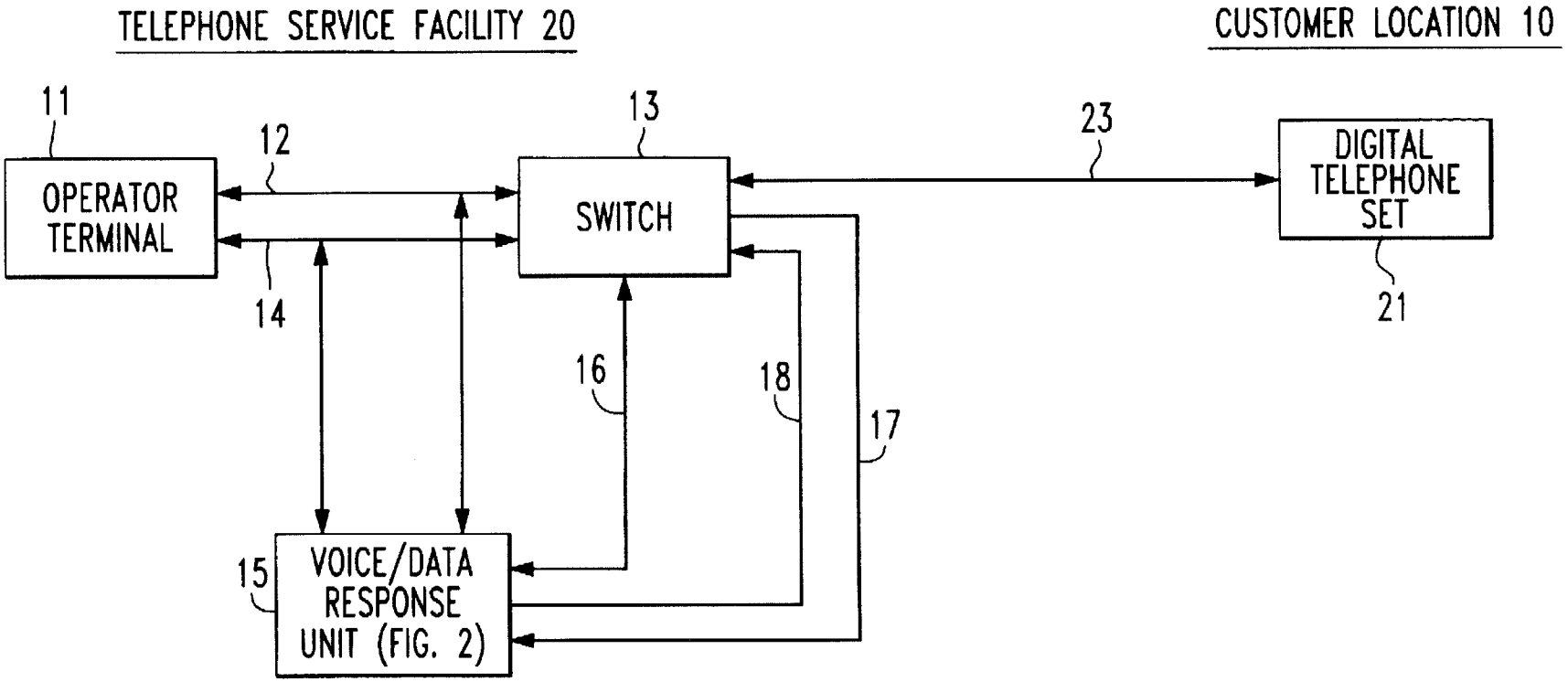
FIG. 1 is a diagrammatic illustration of a telephone communication path between a calling subscriber and an operator/switch position coupled with a voice/data-formatted information storage and retrieval system in accordance with the present invention.

DETAILED DESCRIPTION:

Before describing in detail the particular improved voice/data-formatted telephone information storage and retrieval system in accordance with the present invention, it should be observed that the present invention resides primarily in a novel structural combination of conventional data/signal processing components and communication circuits and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the FIGS. do not necessarily represent the mechanical structural arrangement of the exemplary system, but are primarily intended to illustrate the major structural components of the system in a convenient functional grouping, whereby the present invention may be more readily understood.

Referring now to FIG. 1 there is shown a diagrammatic illustration of a telephone communication path through which a calling subscriber 10 accesses a telephone service facility 20 in order to obtain information supplied by that facility. For the purpose of providing an exemplary environment in which the present invention may be applied, in the description to follow it will be assumed that the accessed operator position is a directory assistance position. However, it should be realized that the invention is not limited to such a facility, but may be utilized with substantially any information facility where operator assistance is employed for the retrieval of information from a stored database. The telephone service facility 20 itself contains a conventional arrangement of an operator terminal 11, which is linked in the customary manner of a present day communication link (e.g. an ISDN link), via voice and data channels 12 and 14, respectively, to an automated call director or switch 13 such as a 5ESS manufactured by AT&T. Switch 13, in turn, is coupled to an incoming telephone link 23 through which calling subscriber 10 communicates with service facility 20.

As will be described below with reference to FIG. 3, where the telephone equipment 21 employed by calling subscriber 10 is a digital unit, having message buffer and display capability, the operator may selectively initiate return of requested information in digital format, rather than a verbalized message. In such a situation, the processing of a directory assistance request, including capture and display of the data representing the response to the directory assistance request at the calling subscriber's unit 21, would be accomplished effectively immediately, so that the next call awaiting service could be handled more quickly.

As pointed out above, the overall communication path through which the service facility operator and the calling subscriber are connected and communicate with one another, including terminal 11, audio and data channels 12 and 14, switch 13 and telephone link 23 is conventional. In addition, normally interfaced with the operator terminal 11 and switch 13 there would be an automatic response unit (not shown) that is selectively accessed by the operator to provide a mechanized voice message response containing the requested directory information through switch 13 over line 23 to the calling subscriber. In the system configuration shown in FIG. 1, however, in place of this conventional, limited capability automatic response unit, there is provided a processor-based [‘personalized’voice] *‘personalized voice’*/data response unit 15, to be described in detail below with reference to FIG. 2, which is coupled with operator terminal 11 and switch 13 and which has the dual capability of assembling and audibly verbalizing a directory assistance message from a stored digital data base, in the voice of the terminal operator who is on-line with the calling subscriber, and of selectively forwarding a digitally formatted message containing the requested information to the calling subscriber for capture and display at a digital telephone set.

For this purpose, voice/data response unit 15 is coupled with each of audio channel 11 and data channel 14 of the communications link between operator terminal 11 and switch 13. Audio channel 12 couples audio (e.g. voice) signals between the operator (headset) and the voice link through the switch, while data channel 14 carries the digital control signals through which the data/signal processing components of terminal 11 and switch 13 communicate with one another in the course of the intercept, processing and release of a call. (As noted above, both the hardware and the signal processing and communication mechanisms employed for this purpose are conventional and will not be detailed here, as a description of the same is unnecessary for understanding the present invention.) Through its connection to audio channel 12, voice/data response unit 15 is able to receive (for storage and later on-line playback) words and phrases that are voiced by the operator and to couple played-back voice messages to the audio channel through which the operator and calling subscriber converse with one another. Data channel 14 is used to couple digital signals generated at the operator terminal 11 (i.e. keyboard initiated) for controlling the operation [o] *of* unit 15.

Voice/data response unit 15 is also directly interfaced with switch 13 through a dedicated audio link 16 and a pair of input and output data links 17 and 18, respectively. Audio link 16 serves to couple either voice or digitally formatted messages from voice/data response unit 15 to switch 13 for application to link 23 and transmission to the calling subscriber 10, without interfacing such messages to the audio link with the operator. Link 16 is similar to the connection of a conventional automatic response unit to the switch, which supplies a prerecorded mechanical voice message to the subscriber in response to a keyed input from the operator (who normally simultaneously releases from the call). However, unlike a conventional automatic response unit, the message coupled over link 16 to switch 13 may be transmitted in digital format (for capture and display by a digital capability telephone set) or, in audio format, in which case it is assembled from a database that causes the played back message to be verbalized in the voice of the operator who is on line with the subscriber. Links 17 and 18 are digital control links through which the switch 13 and unit 15 conduct communication control operations.

Figure 2:
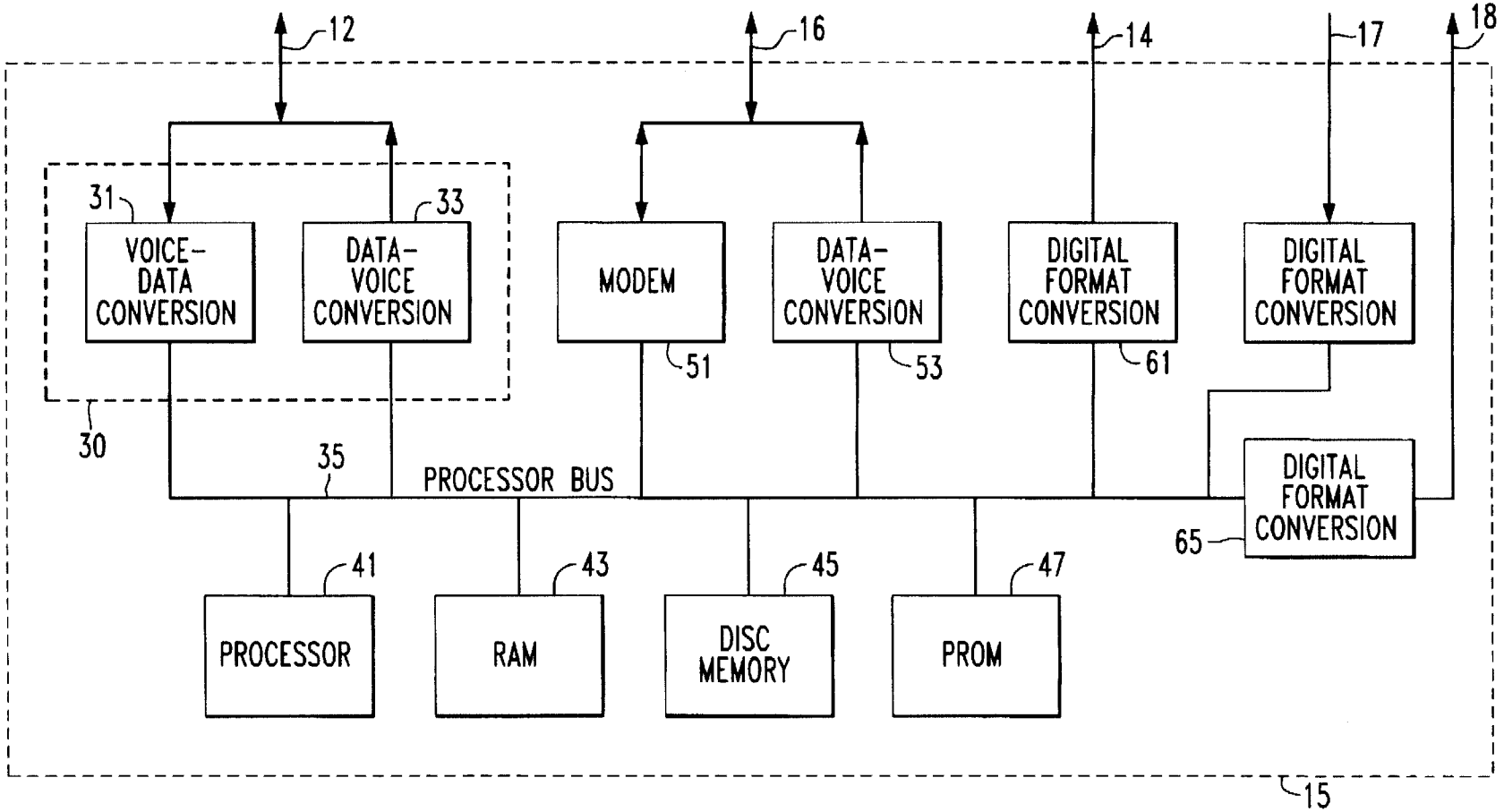
FIG. 2 diagrammatically illustrates the make-up of a voice/data-formatted telephone information storage and retrieval system in accordance with the present invention.

Referring now to FIG. 2, the configuration of voice/data response unit 15 is shown as comprising a (digital/analog, analog/digital) format conversion unit 30 comprised of respective analyzer and synthesizer chips 31 and 33 (both OKI SEMI.M5218), which are coupled between audio link 12 and an internal digital communications bus 35 within unit 15. Under the control of an internal microprocessor 41 (INTEL 8086), the control program for which is stored in PROM 47 (INTEL 2764), digitizer chip 31 converts messages voiced by the operator into digital format, the digitized messages being stored in (semiconductor) random access memory 43 (RAM) (HITACHI HM50464) or disk (e.g. floppy, hard or optical) (SEAGATE 225) memory 45. Typically, RAM 43 is used to store abbreviated (on the order of several to ten seconds in duration), frequently accessed words and phrases, while disk memory 45 may store relatively lengthy (20 seconds to several minutes), less often used sentences, the delay in initiating the playback of which is not critical, as in the case of very brief phrase retrieved from RAM 43. Synthesizer chip 33 converts ([r] *or* verbalizes) digitally encoded message data accessed from one of memories 43 and 45 into audio format for application to audio link 12. In effect, the message storage and retrieval mechanism embodied in the communication path between operator terminal 11 (via audio link 12) and voice/data response unit corresponds to that described in the above-reference Winter et al patents, as messages to be played back to the calling subscriber are stored in the voice of the operator who is on line and services the call and are selectively accessed from memory and verbalized back to the calling party (and operator simultaneously via audio link 12) in accordance with information contained in the incoming call.

In addition, during the recording process, the operator voices the word components of which the messages are made in a number of different inflections (e.g. low, neutral and high), so that the control software through which processor 41 causes the message components to be accessed from memory and joined together or concatenated (e.g. the phrase: "The number is: 555-1212" is formed by concatenating the message components: 'the', 'number', 'is', 'five' (repeated twice), 'one', 'two', 'one' and 'two') my create a response message that sounds 'personalized' or human. Thus, in the case of the parenthetical example, the high inflection versions of the word 'five' and the word 'two' may be accessed from memory to verbalize the last "5" and each occurrence of the number "2" in the message sequence, so as to more realistically recreate a typical human speech pattern.

As pointed out above, in addition to verbalizing response messages accessed from digital memory in the voice of the on-line operator (with realistic inflections of the message components) voice/data response unit 15 may selectively cause a response message to be coupled in digital communications format directly to switch 13, exclusive of audio communications link 12, for transmission from the switch 13 over telephone link 23 to calling subscriber 10, whereby the response message may be captured and displayed to the caller by way of a digital communications device 21 provided at the location from which the calling [subscribe] *subscriber* accesses facility 20.

For this purpose, voice/data response unit 15 is coupled to switch 13 by way of an auxiliary (audio band) link 16 over which both voice and digitally formatted messages may be coupled to switch 13. Auxiliary link 16 is interfaced with the internal memory of voice/data response unit 15 by way of a modem 51 and a second synthesizer chip 53. Modem 51 preferably comprises a conventional Bell 212A modem (XECOM XE1212), through which digitally formatted messages accessed from internal memory (RAM 43 or disk memory 45) are transmitted via link 16 and switch 13 to the telephone link 23, and through which incoming communication messages from the remote subscriber set 21 (e.g. a response to a query from unit 15 as to whether remote set 21 possesses digital communication and display capability) are received and coupled to control processor 41. Synthesizer 53 chip is identical to synthesizer chip 33 within format conversion unit 30 and is used when verbalizing a response message directly out to the calling subscriber via link 16 without simultaneous presentation of the message to the operator. This functionality is similar to that utilized in a conventional automatic response unit in which a message is voiced out to the subscriber via the switch by the operator's keying of a line designator on the terminal console screen, which causes the information highlighted on the operator's CRT to be accessed and forwarded as a response message to the caller end, at the same time releases the operator to handle another call. However, a significant difference is the fact that, in accordance with the present invention, the message is not verbalized in a 'mechanical' sounding manner, but is controllably inflected in the voice of the operator who is servicing the call.

By supplementing the synthesized voice playback capability of unit 15 with the auxiliary digital communication facility provided by modem 51, the present invention not only offers the customer a multipurpose communication mechanism, but one which has the ability to significantly reduce the on-line time of both the calling subscriber and the operator. Namely, where the subscriber's telephone set is equipped with digital communication capability such as that employed in retail point-of-sales credit card verification devices, through an initial interrogation transmission (poll) conducted by processor 41 through modem 51, unit 15 can be effectively immediately apprised whether the call can be serviced digitally. Because link 16 is connected exclusive of the operator terminal, the polling of the calling subscriber's set can be effected prior to operator becoming connected to the caller. If the polling inquiry indicates that the calling subscriber's set [possess] *possesses* digital capability, the operator may cause the requested information (response message) to be transmitted digitally, as the call is released. The calling party sees the requested information (which is buffered in the customer's set) displayed immediately and hangs up, so that the time on-line is reduced and thereby accessibility to the service facility enhanced.

Also shown in FIG. 2 is the digital interface circuitry through which communication control signalling is conducted between the voice/data response unit 15 and each of operator terminal 11 and switch 13. Specifically, each of digital communication links 17 and 18, through which respective incoming and outgoing communication control messages are coupled with switch 13, is coupled to a respective digital format conversion unit 63 and 65, (both Motorola MC 68681) such as RS-232 and RS-422 or packet switch units (e.g X.25 protocol-compatible), depending upon the manufacturer's switch type. Similarly, data link 14 is coupled to a dedicated digital format conversion unit 61 (MC68681) for interfacing digital communication control signals from the operator's terminal 11 with unit 15. Link 14 is read by control processor 41 to determine the status of the operator's console, i.e. the status of any pending call. It also is used to control the operation of the unit during the recording of response messages by the operator prior to the operator placing the unit into service.

Figure 3:
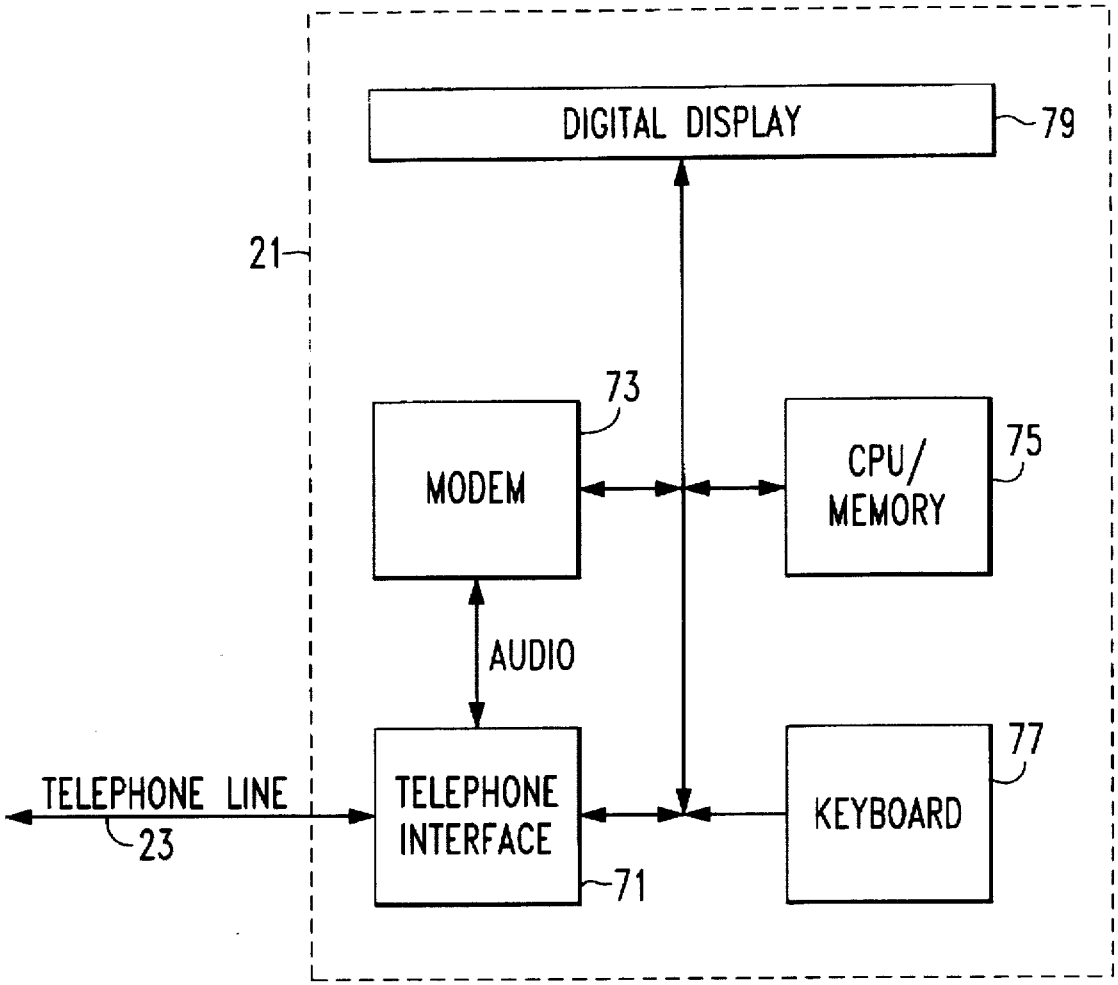
FIG. 3 diagrammatically illustrates the configuration of a telephone handset having digital communication and display capability.

Referring now to FIG. 3, there is a shown a diagrammatic illustration of the components of a telephone set possessing the capability of conducting digital communications with unit 15 and thereby capable of capturing and displaying a digitally formatted response message (e.g. a requested telephone number from directory assistance). As shown in FIG. 3, digital telephone set 21 comprises a standard telephone interface circuit 71, an associated modem 73, internal processor and memory 75, keyboard 77 and digital display 79. Such a set may be a conventional digital telephone unit such as that employed at point-of-sales terminals for retail credit data checks, such as a CAT-100 manufactured by OMRON. When a digital response message is forwarded from the service facility over the telephone line 2 to set 21, it is coupled through the telephone circuit 71 and modem 73 to be captured in a storage buffer, so that it may be displayed on digital display 79. Since the digital telephone is controlled by the calling subscriber, the number is available as long as the subscriber needs it until erased.

OPERATION

Record Mode

The record mode is employed by the operator at the telephone service facility to record response messages that will be available for playback during the operator's work period. The storage and retrieval capability of voice/data response unit 15 allows the operator to record messages directly from her terminal position by speaking into her headset microphone and by placing the record unit in the record mode from the operator terminal keyboard. In the course of preparing a file of response messages, predetermined (e.g. supervisor approved/edited) response words and phrases are recorded by the operator as the operator supplies control signals from terminal 11 over data link 14. Control processor 41 within unit 15 responds to the operator-source digital message and sets up internal memory and digitizer circuitry for receiving the operator-voice words and phrases. As pointed out previously, the words and phrases, particularly individual words, such as numerical digits, are preferably repeated by the operator with different inflections for each repeat utterance, so that when a response message is assembled by concatenating individual words, the resulting phrase or sentence will have a realistic human voice characteristic.

The operator's voiced messages, when spoken into the headset microphone, are coupled over audio link 12 to digitizer 31 and controllably written into RAM 43. The particular response message codes and associated response messages are generated such that processor 41 will know where to store the response messages in RAM 43. Simply put, each response message will be identified by a binary code coupled from the operator terminal 11 over link 14. The operator then proceeds to speak the message to be stored in memory. The beginning and end of a spoken message is preferably monitored by a voice detect circuit coupled with the operator's headset, similar to that of the voice detector employed in the telephone operator voice storage and retrieval system described in the above-referenced Winter et al patent. When the message is complete, processor 41 terminates the generation of address signals for the storage of the message in RAM 43.

Once a complete response phrase/word file has been stored in RAM 43, it may be controllably transferred to disk memory 45. Preferably, RAM 43 contains those words and phrases which require effective immediate retrieval and playback to the calling party. Messages which have a fairly long playback time, such as several sentences or paragraphs may be permanently stored in disk memory 45 and read out therefrom during the playback mode.

Playback Mode

As pointed out previously, because of the versatility of the present invention, response messages which are accessed from memory may be played back in either audio format (verbalized out to the calling subscriber) or forwarded in digital format (where the subscriber's telephone set possesses digital storage and display capability). Moreover, verbalization of a message retrieved from memory may be coupled to either the operator's audio line, so that the operator remains on line and can speak to the calling subscriber, or may be supplied directly to switch 13 via auxiliary link 16, permitting the operator to release the call and attend to another call. Each of these respective options will be discussed individually below.

MESSAGE VERBALIZATION THROUGH OPERATOR AUDIO LINK

As pointed out previously, the exemplary environment in which the present invention is employed is assumed to be that of a directory assistance terminal position. When a directory assistance request call comes into the operator terminal from switch 13, a communication control signal is supplied over input link 14 indicating that a call has been received, which causes processor 41 to access a prescribed 'greeting' message. This initial 'greeting' message is applied to synthesizer [13] *33* and thereby 'voiced' out over audio link 12, so that it may be verbalized to the calling subscriber through switch 13 and, at the same time, to the operator headset. The 'greeting' message may include whatever introductory phrase the directory assistance facility desires plus another functional phrase, such as "directory assistance, may I help you?". At this point, the operator listens to the request voiced by the calling subscriber and causes directory assistance listings to be displayed on her terminal screen. If the customer asks for information which requires the operator to personally speak information to the calling subscriber, the operator may now converse with the calling subscriber through audio link 14. If, in the course of the conversation, the operator determines that the information requested can be assembled from data stored in memory, so that it may be synthesized back to the calling subscriber and the operator may release, then the operator may key-in the appropriate response message access code through her terminal, such as through a conventional line designator on her terminal screen, which causes the message to be accessed from memory and played out directly to the switch 13 through synthesizer 53 and auxiliary link 16. At the same time, the operator releases her position.

CPU 41 monitors link 14 for the identification of the message to be retrieved and an operator release code. Upon recognizing the operator release (end-of-call) code on line 14, processor 41 prepares to answer the next incoming call to the operator on audio link 12, just as it has done. The operator release signal on link 14 is also detected by switch 13, which forwards a command on link 17 requesting processor 41 to cause the message to be coupled to auxiliary link 16 directly to the switch, so that it may be voiced out to the calling subscriber. If auxiliary link 16 is presently busy, switch 13 waits for processor 41 to forward a transmission complete signal on link 18, advising the switch 13 that the auxiliary link 16 is no longer busy. Switch 13 then transmits a message initiate command on link 17 requesting a playback of the message on auxiliary link 16. Processor 41 then connects auxiliary link 16 to the call that has just been released from the operator terminal 11 and switch 13 forwards a command over link 17 for retransmission of the message to the calling subscriber. In response to this command, processor 41 prepares or assembles a list of words and phrases to be concatenated to provide the proper telephone message, taking into account any necessary inflection associated with a set of codes for that particular message and selects the proper inflection phrase. Processor 41 then sequentially accesses the components of the message from memory, so that they may be synthesized via synthesizer 53 and verbalized out over link 16 to the switch. When the message is complete, a transmission complete signal is coupled over link 18 to switch 13, so that a new call may be handled.

RESPONSE MESSAGE DIGITALLY FORMATTED

In those circumstances where the calling subscriber's telephone set possesses digital storage and display capability, the choice of the digital transmission option is a particularly attractive mechanism to speed-up handling of the call. In this circumstance, when the call is intercepted, but prior to the operator coming on-line, digital communications by way of modem 51 between the CPU 41 and the subscriber's digital equipment advise the unit 15 that a response message may be digitally formatted and forwarded to the calling subscriber. Thereupon, an indication that the calling subscriber possesses digital signalling capability is forwarded over link 18 to switch 13 which, in turn, advises the operator terminal 11 via link 14.

In the same manner as answering a call, in a verbalizer format when the operator releases and initiates a digital response message by keying in a digital response request via her terminal keyboard, voice/data response unit 15 initially determines whether auxiliary link 16, through which digital message are transmitted, is presently busy. If so, switch 13 waits for the processor 41 to forward a message on link 18 indicating that the current message transmission which is occupying auxiliary link 16 is complete. Upon receipt of this message, switch 13 sends a command over link 16, requesting unit 15 to prepare to transmit the data in digital format to the calling subscriber. When the operator select the appropriate response phrase to be transmitted out to the calling subscriber, processor 41 then awaits a transmission request from switch 13, once switch 13 has connected audio link 16 to the calling line. Processor 41 then accesses the data and forwards it to the outgoing buffer within modem 51, and causes the digital message to be transmitted to the calling subscriber via auxiliary link 16 through the switch and link 13. Once the message has been digitally transmitted out, a transmission-complete signal is forwarded out over link 18 to the switch, indicating that it may now prepare to handle a new call. The digital message itself will be heard as a brief garbled tone by the subscriber and the response number will be immediately displayed on the display of the subscriber's handset. The time required to complete this operation is on the order of a fraction of a second, as compared to the time that is normally requested for the verbalizing of the response message (here a telephone number). As a result, the service facility can release the call effectively immediately once the operator keys in the number requested by the calling subscriber.

As will be appreciated from the foregoing description, the present invention provides a mechanism for applying the 'personalized' voice attributes of the above-identified patented system to a synthesized message storage and retrieval system in which customer response messages (such as a directory assistance-requested number) are generated by concatenating a sequence of words that have been recorded in digital memory in the voice of the operator and selectively accessed from memory in accordance with prescribed inflection (rising, falling, neutral) characteristics. By linking together phrases or words having selectively chosen inflections in the voice of the operator, particularly sequences of numbers (in reply to a directory assistance request), the resulting vocalized message will more naturally simulate the manner of speech of the operator and thereby provide a more realistic verbalization of the message to the customer. As an additional feature, the communications functionality of present invention enables a message retrieved from memory to be transmitted in digital format, so that it may be captured and visually indicated to the customer via a digital display provided in the calling subscriber's telephone equipment.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with an operator-assisted telephone service facility having an operator terminal through the operation of which an on-line operator services incoming calls that are coupled to said facility by way of a switch device to which a telephone link, over which an incoming caller communicates with said facility, is connected, said operator terminal being coupled to said switch device by way of a communications link therebetween, and wherein on-line participation by an on-line operator is required for effectively enabling an incoming caller to reach a called destination, an arrangement for providing a response message to said incoming caller accessing said facility comprising:

first operational means for storing a plurality of message components of which a response message may be comprised, in a form such that, when played back and transmitted to said incoming caller in a synthetically vocalized audio format, said response message effectively corresponds to the voice of said operator who is on-line with and services an incoming call from said incoming caller; and second operational means, coupled to said first operational means and operable in conjunction with the on-line operator's release of the servicing of said incoming call, for accessing from said first operational means selected ones of said plurality of message components and causing said selected message components to be assembled and transmitted over said telephone link as a synthetically vocalized audio response message to said incoming caller in the voice of said on-line operator who has released from the servicing of said incoming call, so that it appears to said incoming caller that the released operator is still on-line with [an] *and* vocalizing said response message to said incoming caller, *wherein said second operational means further comprises means for controllably causing said response message to be transmitted to said incoming caller in a digital communications format, whereby said response message may be captured and displayed to said incoming caller by way of a digital communications device provided at the position from which said incoming caller accesses said facility.*

[2. An arrangement according to claim 1, wherein said second operational means further comprises means for controllably causing said response message to be transmitted to said incoming caller in a digital communications format, whereby said response message may be captured and displayed to said incoming caller by way of a digital communications device provided at the position from which said incoming caller accesses said facility. ]

3. For use with an operator-assisted telephone service facility having an operator terminal through the operation of which an on-line operator services incoming calls that are coupled to said facility by way or a switch device to which [an] *a* telephone link, over which an incoming caller communicates with said facility, is connected, said operator terminal being coupled to said switch device by way of a communications line therebetween, and wherein on-line participation by an on-line operator is required for effectively enabling an incoming caller to reach a called destination, an arrangement for providing a response message to said incoming caller accessing said facility comprising:

first operational means for storing a plurality of message components of which a response message may be comprised; and second operational means, coupled to said first operational means and operable in conjunction with the on-line operator's servicing of an incoming call, for accessing from said first operational means selected ones of said plurality of message components and causing said selected message components to be assembled and transmitted over said telephone link as a response message to said incoming caller in a selected one of a plurality of different communication formats by way of which said response message is capable of being transmitted to said incoming caller, said second operational means including means for selectively causing said response message to be coupled to said communications link and thereby through said switch device to said telephone link for transmission to said incoming caller, and directly to said switch device, exclusive of said communications link, for transmission therefrom over said telephone link to said incoming caller.

4. An arrangement according to claim 3, wherein said second operational means comprises means for selectively causing said response message to be coupled in digital communications format directly to said switch device, exclusive of said communications link, for transmission therefrom to said incoming caller over said telephone link, whereby said response message may be captured and displayed to said incoming caller by way of a digital communications device provided at the position from which said incoming caller accesses said facility.

5. An arrangement according to claim 4, wherein said communications link includes a digital communications link portion by way of which digital communication signals are transmitted between said operator terminal and said switch device, and an audio link portion by way of which voice communications between said operator and said incoming caller, via said switch device, are effected, and wherein said second operational means includes means for causing message components accessed from said first operational means to be coupled therefrom to said audio link portion of said communications link for application to said switch device and transmission therefrom over said telephone link as an audio response message to said incoming caller vocalized in the voice of the operator who is on-line with and servicing an incoming call.

[6. For use with an operator-assisted telephone service facility having an operator terminal through the operation of which an on-line operator services incoming calls that are coupled to said facility by way of a switch device to which a telephone link, over which an incoming caller communicates with said facility, is connected, said operator terminal being coupled to said switch device by way of a communications link therebetween, and wherein on-line participation by an on-line operator is required for effectively enabling an incoming caller to reach a called destination, a method for providing a response message to said incoming caller accessing said facility comprising the steps of:

(a) storing, in a storage device, a plurality of message components of which a response message may be comprised, in a form such that, when played back and transmitted to said incoming caller in a synthetically vocalized audio format, said response message effectively corresponds to the voice of the operator who is on-line with and services incoming calls; and (a) accessing, from said storage device, in the course of the on-line operator's release of the servicing of said incoming call, selected ones of said plurality of message components and causing said selected message components to be assembled and transmitted over said telephone link as a synthetically vocalized audio response message to said incoming caller in the voice of said on-line operator who has released from the servicing of said incoming call, so that it appears to said incoming caller that the released operator is still on-line with and vocalizing said response message to said incoming caller.]

7. [An arrangement according to claim 6, further comprising the step of (c) causing] *For use with an operator-assisted telephone service facility having an operator terminal through the operation of which an on-line operator services incoming calls that are coupled to said facility by way of a switch device to which a telephone link, over which an incoming caller communicates with said facility, is connected, said operator terminal being coupled to said switch device by way of a communications link therebetween, and wherein on-line participation by an on-line operator is required for effectively enabling an incoming caller to reach a called destination, a method for providing a response message to said incoming caller accessing said facility comprising the steps of:*

*(a) storing, in a storage device, a plurality of message components of which a response message may be comprised, in a form such that, when played back and transmitted to said incoming caller in a synthetically vocalized audio format, said response message effectively corresponds to the voice of the operator who is on-line with and services incoming calls; and*

*(b) accessing, from said storage device, in the course of the on-line operator's release of the servicing of said incoming call, selected ones of said plurality of message components and causing said selected message components to be assembled and transmitted over said telephone link as* said response message [to be transmitted] to said incoming caller in a digital communications format, whereby said response message may be captured and displayed to said incoming caller by way of a digital communications device provided at the position from which said incoming caller accesses said facility.

8. For use with an operator-assisted telephone service facility having an operator terminal through the operation of which an on-line operator services incoming calls that are coupled to said facility by way of a switch device to which a telephone link, over which an incoming caller communicates with said facility, is connected, said operator terminal being coupled to said switch device by way of a communications link therebetween, and wherein on-line participation by an on-line operator is required for effectively enabling an incoming caller to reach a called destination, a method for providing a response message to said incoming caller accessing said facility comprising the steps of:

(a) storing, in a storage device, a plurality of message components of which a response message may be comprised; and (b) accessing from said storage device, in the course of the on-line operator's servicing of an incoming call, selected ones of said plurality of message components and causing said selected message components to be assembled and transmitted over said telephone link as a response message to said incoming caller in a selected one of a plurality of different communication formats by way of which said response message is capable of being transmitted to said incoming caller, step (b) including the step of selectively causing said response message to be coupled to said communications link and thereby through said switch device to said telephone link for transmission to said incoming caller, and directly to said switch device, exclusive of said communications link, for transmission therefrom over said telephone link to said incoming caller.

9. A method according to claim 8, wherein step (b) comprises the step of selectively causing said response message to be coupled in digital communications format directly to said switch device, exclusive of said communications link, for transmission therefrom to said incoming caller over said telephone link, whereby said response message may be captured and displayed to said incoming caller by way of a digital communications device provided at the position from which said incoming caller accesses said facility.

10. A method according to claim 9, wherein said communications link includes a digital communications link portion by way of which digital communication signals are transmitted between said operator terminal and said switch device, and an audio link portion by way of which voice communications between said operator and said incoming caller, via said switch device, are effected, and wherein said step (b) includes the step of causing message, components accessed from said [first operational means] *storage device* to be coupled therefrom to said audio link portion of said communications link for application to said switch device and transmission therefrom over said telephone link as an audio response message to said incoming caller vocalized in the voice of the operator who is on-line with and servicing an incoming call.

*11. For use with a telephone service facility having a communications link connectable to an operator terminal from which an operator may service a call, said call being coupled to said facility by way of a switch device to which a telephone link, over which a calling party communicates with said facility, is connected, said operator terminal being connectable to said switch device by way of said communications link therebetween, and wherein said telephone service facility includes a first communication path which includes a first channel capable of transmitting an audio voice message thereover and, by way of said switch device, to said telephone link through which said calling party is placed in communication with said telephone facility, and a second communication path which includes a second channel capable of transmitting an audio voice message thereover and, by way of said switch device to said telephone link through which said calling party is placed in communication with said telephone facility, a method of providing vocalized messages by way of said switch device comprising the steps of:*

*(a) selectively supplying, over one of said first and second communication paths, during the operator's servicing of an incoming call a first synthetically verbalized voice message, the contents of which are associated with said calling party's attempt to reach a called party; and*

*(b) selectively supplying, over the other of said first and second communication paths, after the operator's release of the servicing of said incoming call a second synthetically verbalized voice message, the contents of which are associated with said calling party's attempt to reach said called party, wherein said first and second voice messages are in the same voice as the operator who serviced said incoming call.*

*12. A method according to claim 11, wherein step (b) comprises causing said second synthetically verbalized voice message to be coupled through said switch device to said telephone link to said calling party, exclusive of the communications link between the operator terminal and said switch device.*

*13. A method according to claim 11, wherein a synthetically verbalized voice message supplied in one of steps (a) and (b) is dependent upon the type of call being serviced.*

*14. For use with a telephone service facility of the type that is accessible by a calling party in the course of the calling party's placing a call to said telephone service facility in the calling party's attempt to reach a called party, each of said calling and called parties being disposed at locations other than the location of said telephone service facility, said telephone service facility having an operator communications device through which an operator may service a call, said call being coupled to said facility by way of a switch device to which a telephone link, over which said calling party communicates with said facility, is connected, said operator communications device being coupled to said switch device by way of a communication link therebetween, and wherein said telephone service facility includes a first communication path which includes a first channel capable of transmitting an audio voice message thereover and, by way of said switch device, to said telephone link through which said calling party is placed in communication with said telephone service facility, and a second communication path which includes a second channel capable of transmitting an audio voice message thereover and, by way of said switch device, to said telephone link through which said calling party is placed in communication with said telephone facility, a method of providing synthetically verbalized messages by way of said switch device comprising the steps of:*

*(a) selectively supplying, over one of said first and second communication paths, during the operator's servicing of an incoming call a first synthetically verbalized voice message, the contents of which are associated with said calling party's attempt to reach said called party; and*

*(b) selectively supplying, over the other of said first and second communication paths, after the operator's release of the servicing of said incoming call a second synthetically verbalized voice message, the contents of which are associated with said calling party's attempt to reach said called party, wherein said first and second voice messages are in the same voice as the operator who serviced the incoming call.*

*15. A method according to claim 14, wherein a synthetically verbalized voice message supplied in one of steps (a) and (b) is dependent upon the type of call being serviced.*

*16. A method according to claim 14, wherein step (b) comprises causing said second synthetically verbalized voice message to be coupled through said switch device to said telephone link to said calling party, exclusive of the communications link between the operator communications device and said switch device.*

*17. A method according to claim 14, further including the step of storing, in a digital database, a plurality of message components of which a plurality of synthetically verbalized voice messages may be comprised, in a form such that, when synthesized into audio format and played back and transmitted over either of said first and second communication paths, the resulting synthetically verbalized voice messages effectively correspond to the same voice as the operator who serviced said incoming call, and wherein one of steps (a) and (b) comprises, in the course of servicing a call, accessing selected ones of the plurality of stored message components and causing the accessed selected message components to be assembled and synthesized into audio format and transmitted over one of said first and second communication paths as a personalized synthetically verbalized voice message.*

*18. For use with a telephone service facility of the type that is accessible by a calling party in the course of the calling party's placing a call to said telephone service facility in the calling party's attempt to reach a called party, each of said calling and called parties being disposed at locations other than the location of said telephone service facility, said telephone service facility having an operator communications device through which an operator may service a call, said call being coupled to said facility by way of a switch device to which a telephone link, over which said calling party communicates with said facility, is connected, said operator communications device being coupled to said switch device by way of a communications link therebetween, and wherein said telephone service facility includes a first communication path which includes a first channel capable of transmitting an audio voice message thereover and, byway of said switch device, to said telephone link through which said calling party is placed in communication with said telephone facility, and a second communication path which includes a second channel capable of transmitting an audio voice message thereover and, by way of said switch device, to said telephone link through which said calling party is placed in communication with said telephone facility, a method of providing vocalized messages byway of said switch device comprising the steps of:*

*(a) storing a plurality of message components of which a plurality of voice messages may be comprised, in a form such that, when assembled and transmitted to said calling party over either of said first and second communication paths in a synthetically verbalized audio format, the resulting synthetically verbalized voice message effectively corresponds to the voice of the operator who is servicing said call placed by said calling party;*

*(b) in the course of servicing a call, accessing selected ones of the plurality of message components stored in step (a), and causing the accessed selected message components to be assembled and transmitted over one of said first and second communication paths as a first synthetically verbalized voice message, the contents of which are associated with said calling party's attempt to reach said called party; and*

*(c) supplying, over the other of said first and second communication paths, after the operator's release of the servicing of said call placed by said calling party, a second synthetically verbalized voice message, the contents of which are associated with said calling party's attempt to reach said called party, wherein said first and second voice messages are in the same voice as the operator who serviced said call placed by said calling party.*

*19. A method according to claim 18, wherein step (c) comprises causing said second synthetically verbalized voice message to be coupled through said switch device to said telephone link to said calling party, exclusive of the communications link between the operator communications device and said switch device.*

*20. A method according to claim 18, wherein a synthetically verbalized voice message supplied in one of steps (b) and (c) is dependent upon the type of call being serviced.*

*21. For use with a telephone service facility of the type that is accessible by a calling party in the course of the calling party's placing a call to said telephone service facility in the calling party's attempt to reach a called party, each of said calling and called parties being disposed at locations other than the location of said telephone service facility, said telephone service facility having a communications link connectable to an operator terminal from which an operator may service a call, said call being coupled to said facility by way of a switch device to which a telephone link, over which said calling party communicates with said facility, is connected, the communications link with said operator terminal being coupled to said switch device, and wherein said telephone service facility includes a first communication path which includes a first channel capable of transmitting an audio voice message thereover and, by way of said switch device, to said telephone link through which said calling party is placed in communication with said telephone facility, and a second communication path which includes a second channel capable of transmitting an audio voice message thereover and, by way of said switch device, to said telephone link through which said calling party is placed in communication with said telephone facility, an apparatus for providing synthetically verbalized voice messages by way of said switch device comprising:*

*a message store operative to store a plurality of message components of which a plurality of synthetically verbalized voice messages may be comprised, in a form such that, when assembled and transmitted to said calling party over either of said first and second communication paths in a synthetically verbalized audio format, the resulting synthetically verbalized voice messages effectively correspond to the voice of operator at said terminal; and*

*a communications controller which is operative, in the course of servicing said call, to controllably access selected ones of the plurality of stored message components and to cause the accessed selected message components to be assembled and supplied over one of said first and second communication paths as a first synthetically verbalized voice message the contents of which are associated with said calling party's attempt to reach said called party, and which is operative to supply, over the other of said first and second communication paths, a second synthetically verbalized voice message the contents of which are associated with said calling party's attempt to reach said called party, in the same voice as the first message assembled and supplied by said communications controller.*

*22. An apparatus according to claim 21, wherein said communications controller is operative to cause said second synthetically verbalized voice message to be coupled through said switch device to said telephone link to said calling party, exclusive of the communications link between the operator terminal and said switch device.*

*23. An apparatus according to claim 21, wherein a supplied voice message is dependent upon the type of call being serviced.*

*24. An apparatus according to claim 21, wherein said communications controller is further operative to cause a message to be coupled in a digital communications format through said switch device to said telephone link, whereby said message may be captured and displayed to said calling party by way of a digital communications device provided at a position from which said calling party accesses said facility.*

*25. For use with a telephone service facility of the type that is accessible by a calling party in the course of the calling party's placing a call to said telephone service facility in the calling party's attempt to reach a called party, each of said calling and called parties being disposed at locations other than the location of said telephone service facility, said telephone service facility having a communications link connectable with an operator terminal from which an operator may service a call, said call being coupled to said facility by way of a switch device to which a telephone link, over which said calling party communicates with said facility, is connected, the communications link with said operator terminal being coupled to said switch device, and wherein said telephone service facility includes a first communication path which includes a first channel capable of transmitting an audio voice message thereover and, by way of said switch device, to said telephone link through which said calling party may be placed in communication with said telephone facility, and a second communication path which includes a second channel capable of transmitting an audio voice message thereover and, by way of said switch device, to said telephone link through which said calling party may be placed in communication with said telephone facility, a method of providing synthetically verbalized voice messages by way of said switch device comprising the steps of:*

*(a) in response to an incoming call from said calling party accessing said telephone service facility for the purpose of being able to place a call to said called party, supplying, over one of said first and second communication paths, a first audio message in a synthesized voice, the contents of said first audio message including information associated with said calling party's attempt to reach said called party; and*

*(b) subsequent to a reply by the calling party to the first audio message supplied in step (a), supplying over the other of said first and second communication paths, a second audio message in a synthesized voice, the contents of said second audio message including information associated with said calling party's attempt to reach said called party, wherein said first and second audio messages are in the same voice as the operator who serviced said incoming call placed by said calling party.*

*26. A method according to claim 25, wherein a synthesized voice message supplied in one of steps (a) and (b) is dependent upon the type of call being serviced.*

*27. A method according to claim 25, wherein step (b) comprises causing said second audio message to be coupled through said switch device, to said telephone link to said calling party, exclusive of the communications link between the operator terminal and said switch device.*

*28. A method according to claim 25, further including the step of storing, in a digital database, a plurality of message components of which a plurality of synthesized voice messages may be comprised, in a form such that, when synthesized into audio format and played back and transmitted over either of said first and second communication paths, the resulting synthesized voice messages effectively correspond to the voice of the operator at said operator terminal, and wherein one of steps (a) and (b) comprises, in the course of servicing a call, accessing selected ones of the plurality of stored message components and causing the accessed selected message components to be assembled and synthesized into audio format and transmitted over one of said first and second communication paths as a personalized synthetically reproduced audio voice message.*

*29. For use with a telephone service facility of the type that is accessible by a calling party in the course of the calling party's placing a call to said telephone service facility in the calling party's attempt to reach a called party, each of said calling and called parties being disposed at locations other than the location of said telephone service facility, said telephone service facility having a communications link connectable with an operator terminal from which an operator may service a call, said call being coupled to said facility by way of a switch device to which a telephone link, over which a party communicates with said facility, is connected, the communications link with said operator terminal being coupled to said switch device, a method of providing vocalized messages by way of said switch device comprising the steps of:*

*(a) providing a message database, the message data contents of which are capable of being assembled into a plurality of different messages, respectively associated with said calling party's attempt to be placed in communication with said called party;*

*(b) providing a first communication path which includes a first channel capable of transmitting an audio voice message thereover and, by way of said switch device, to said telephone link through which said calling party is placed in communication with said telephone facility, and a second communication path which includes a second channel capable of transmitting an audio voice message thereover and, by way of said switch device, to said telephone link through which said calling party is placed in communication with said telephone facility, and wherein each of said first and second communication paths is arranged to be selectively coupled to said message database and to convey a synthetically verbalized message that has been assembled from the contents of said database in a personalized operator representative voice such that personalized voice messages conveyed over each of said first and second communication paths are in the same personalized operator representative voice as said operator at said operator terminal;*

*(c) supplying, by way of one of said first and second communication paths to said calling party, an interrogation message from said message database, the contents of which request information from said calling party associated with the calling party's attempt to be placed in communication with said called party; and*

*(d) subsequent to receipt of a reply message from said calling party to the interrogation message supplied in step (c), supplying a further message to said calling party by way of one of said first and second communication paths during a period of time other than when said operator is servicing a call, thereby alleviating the operator from being required to service said call on a continuous basis from the beginning of the call to completion, the contents of said further message containing information which, when employed in the course of the calling party's attempt to reach said called party, will facilitate the calling party's being placed in communication with said called party.*

30. A method according to claim 29, wherein a message supplied in one of steps (c) and (d) is dependent upon the type of call being serviced.

31. A method according to claim 29, wherein at least one of steps (c) and (d) comprises causing a message to be coupled through said switch device to said telephone link to said calling party, exclusive of the communications link between the operator terminal and said switch device.

32. For use with a telephone service facility of the type that is accessible by a calling party in the course of the calling party's placing a call to said telephone service facility in the calling party's attempt to reach a called party, each of said calling and called parties being disposed at locations other than the location of said telephone service facility, said telephone service facility having a communications link connectable with an operator terminal from which an operator may service a call, said call being coupled to said facility by way of a switch device to which a telephone link, over which a party communicates with said facility, is connected, the communications link with said operator terminal being coupled to said switch device, an apparatus for providing vocalized messages by way of said switch device comprising:

a message database, the message data contents of which are capable of being assembled into a plurality of different messages, respectively associated with said calling party's attempt to be placed in communication with said called party;

a first communication path which includes a first channel capable of transmitting an audio voice message thereover and, by way of said switch device, to said telephone link through which said calling party is placed in communication with said telephone facility;

a second communication path which includes a second channel capable of transmitting an audio voice message thereover and, by way of said switch device, to said telephone link through which said calling party is placed in communication with said telephone facility; and a communications controller, coupled to each of said first and second communication paths and to said message database, and operative to cause a message that has been assembled from the contents of said database to be synthetically verbalized in a personalized operator representative voice such that personalized voice messages conveyed over each of said first and second communication paths are in the same personalized operator representative voice as said operator at said operator terminal, said communications controller being operative to supply, by way of one of said first and second communication paths to said calling party, an interrogation message the contents of which request information from said calling party associated with the calling party's attempt to be placed in communication with said called party and, subsequent to receipt of a reply message from said calling party to the interrogation message, supplying a further message to said calling party by way of one of said first and second communication paths during a period of time other than when said operator is servicing a call, thereby alleviating the operator from being required to service said call on a continuous basis from the beginning of the call to completion, the contents of said further message containing information which, when employed in the course of the calling party's attempt to reach said called party, will facilitate the calling party's being placed in communication with said called party.

33. An apparatus according to claim 32, wherein a message supplied by said communications controller is dependent upon the type of call being serviced.

34. An apparatus according to claim 32, wherein said communications controller is operative to cause a message to be coupled through said switch device to said telephone link to said calling party, exclusive of the communications link between the operator terminal and said switch device.

35. An apparatus according to claim 32, wherein said communications controller is operative to cause a message to be coupled in a digital communications format through said switch device to said telephone link, whereby said message may be captured by and displayed to said calling party by way of a digital communications device provided at a location by way of which said calling party is in communication with said telephone service facility.

36. For use with a telephone service facility having an operator terminal through the operation of which an on-line operator may service incoming calls that are coupled to said facility by way of a switch device to which a telephone link, over which an incoming caller communicates with said facility, is connected, an arrangement for providing a response message to said incoming caller accessing said facility comprising:

first operational means for storing a plurality of message components of which a response message may be comprised, in a form such that, when played back and transmitted to said incoming caller in a synthetically vocalized audio format, said response message effectively corresponds to the appropriately inflected voice of an operator who said incoming caller perceived to be on-line with and servicing an incoming call from said incoming caller; and second operational means, coupled to said first operational means and operable in conjunction with the servicing of said incoming call, for accessing from said first operational means selected ones of said plurality of message components and causing said selected message components to be assembled and transmitted over said telephone link when said operator is off-line as a synthetically vocalized audio response message to said incoming caller in the appropriately inflected voice of said operator who said incoming caller perceived to be on-line with and servicing said incoming call from said incoming caller, so that it appears to said incoming caller that the operator is actually on-line with and vocalizing said response message to said incoming caller, wherein said second operational means further comprises means for controllably causing said response message to be transmitted to said incoming caller in a digital communications format, whereby said response message may be captured and displayed to said incoming caller by way of a communications device provided at the position from which said incoming caller accesses said facility.

37. For use with a telephone service facility having an operator terminal through the operation of which an on-line operator may service incoming calls that are coupled to said facility by way of a switch device to which a telephone link, over which an incoming caller communicates with said facility, is connected, said operator terminal being coupled to said switch device by way of a communications link therebetween, an arrangement for providing response message to said incoming caller accessing said facility comprising:

first operational means for storing a plurality of message components of which a response message may be comprised; and

*second operational means, coupled to said first operational means and operable in conjunction with the servicing of an incoming call, for accessing from said first operational means selected ones of said plurality of message components and causing said selected message components to be assembled and transmitted over said telephone link as a response message to said incoming caller in a selected one of a plurality of different communication formats by way of which said response message is capable of being transmitted to said incoming caller, said second operational means including means for selectively causing said response message to be coupled to said communications link and thereby through said switch device to said telephone link for transmission to said incoming caller, and directly to said switch device, exclusive of said communications link, for transmission therefrom over said telephone link to said incoming caller.*

*38. An arrangement according to claim 37, wherein said second operational means further comprises means for selectively causing said response message to be coupled in digital communications format directly to said switch device, exclusive of said communications link, for transmission therefrom to said incoming caller over said telephone link, whereby said response message may be captured and displayed to said incoming caller by way of a communications device provided at the position from which said incoming caller accesses said facility.*

*39. An arrangement according to claim 38, wherein said communications link includes a digital communications link portion by way of which digital communication signals are transmitted between said operator terminal and said switch device, and an audio link portion by way of which voice communications between said operator and said incoming caller, via said switch device, are effected, and wherein said second operational means includes means for causing message components accessed from said first operational means to be coupled therefrom to said audio link portion of said communications link for application to said switch device and transmission therefrom over said telephone link as an audio response message to said incoming caller vocalized in the appropriately inflected voice of the operator who said incoming caller perceives to be on-line with and servicing said incoming call from said incoming caller.*

*40. For use with a telephone service facility having an operator terminal through the operation of which an on-line operator may service incoming calls that are coupled to said facility by way of a switch device to which a telephone link, over which an incoming caller communicates with said facility, is connected, a method for providing a response message to said incoming caller accessing said facility comprising the steps of:*

*(a) storing, in a storage device, a plurality of message components of which a response message may be comprised, in a form such that, when played back and transmitted to said incoming caller in a synthetically vocalized audio format, said response message effectively corresponds to the appropriately inflected voice of an operator who said incoming caller perceives to be on-line with and servicing incoming calls; and*

*(b) accessing, from said storage device, in the course of the servicing of an incoming call, selected ones of said plurality of message components and causing said selected message components to be assembled and transmitted over said telephone link when said operator is off-line as said response message to said incoming caller in a digital communications format, whereby said response message may be captured displayed to said incoming caller by way of communications device provided at the position from which said incoming caller accesses said facility.*

*41. For use with a telephone service facility having an operator terminal through the operation of which an on-line operator may service incoming calls that are coupled to said facility by way of a switch device to which a telephone link, over which an incoming caller communicates with said facility, is connected, said operator terminal being coupled to said switch device by way of a communications link therebetween, a method for providing a response message to said incoming caller accessing said facility comprising the steps of:*

*(a) storing, in a storage device, a plurality of message components of which a response message may be comprised; and*

*(b) accessing from said storage device, in the course of the servicing of an incoming call, selected ones of said plurality of message components and causing said selected message components to be assembled and transmitted over said telephone link as a response message to said incoming caller in a selected one of a plurality of different communication formats by way of which said response message is capable of being transmitted to said incoming caller, step (b) including the step of selectively causing said response message to be coupled to said communications link and thereby through said switch device to said telephone link for transmission to said incoming caller, and directly to said switch device, exclusive of said communications link, for transmission therefrom over said telephone link to said incoming caller.*

*42. A method according to claim 41, wherein step (b) further comprises the step of selectively causing said response message to be coupled in digital communications format directly to said switch device, exclusive of said communications link, for transmission therefrom to said incoming caller over said telephone link, whereby said response message may be captured and displayed to said incoming caller by way of a communications device provided at the position from which said incoming caller accesses said facility.*

*43. A method according to claim 42, wherein said communications link includes a digital communications link portion by way of which digital communication signals are transmitted between said operator terminal and said switch device, and an audio link portion by way of which voice communications between said operator and said incoming caller, via said switch device, are effected, and wherein said step (b) includes the step of causing message components accessed from said storage device to be coupled therefrom to said audio link portion of said communications link for application to said switch device and transmission therefrom over said telephone link as an audio response message to said incoming caller vocalized in the appropriately inflected voice of the operator who said incoming caller perceives to be on-line with and servicing said incoming calls from said incoming caller.*

* * * * *